United States Patent [19]

Ohtomo et al.

[11] Patent Number: 5,397,838
[45] Date of Patent: Mar. 14, 1995

[54] POLYPHENYLENE ETHER RESIN COMPOSITIONS

[75] Inventors: Takashi Ohtomo, Utsunomiya; Hiromi Ishida; Hidekazu Kabaya, both of Moka, all of Japan

[73] Assignee: General Electric Company, Pittsfield, Mass.

[21] Appl. No.: 960,743

[22] Filed: Oct. 14, 1992

[30] Foreign Application Priority Data

Oct. 16, 1991 [JP]  Japan ................................. 3-294898

[51] Int. Cl.$^6$ ............................................. C08L 77/00
[52] U.S. Cl. ...................................... 525/92; 525/66; 525/132; 525/133; 525/149; 525/151; 525/391; 525/395; 525/396; 525/397
[58] Field of Search .......................................... 525/92

[56] References Cited

U.S. PATENT DOCUMENTS 4,873,276 10/1989 Fujii et al. ............................ 524/153

Primary Examiner—Ana L. Carrillo

[57] ABSTRACT

The present inventions provides polyphenylene ether (PPE)/polyamide (PA) resin compositions having excellent dimensional stability when they absorb moisture, and good mechanical and other properties. Resin compositions of (A) 10–80 wt. parts PPE resins and (B) 90–20 wt. parts PA resins, in which the PA resins (a) are polymers formed by condensation of linear aliphatic diamines with linear aliphatic dicarboxylic acids and aromatic dicarboxylic acids, and (b) have terminal amino group contents of at least 0.4 mequiv/g.

9 Claims, No Drawings

POLYPHENYLENE ETHER RESIN COMPOSITIONS

The present invention relates to thermoplastic compositions containing polyphenylene ether (hereinafter referred to as "PPE") resins and polyamide (hereinafter "PA") resins. Specifically, it relates to resin compositions of this type which have excellent dimensional stability when they absorb moisture.

Resin compositions comprising PPEs and PAs are used in automobile parts, electric and electronic parts, machine parts, etc. because of their excellent heat resistance, forming processability, oil resistance, and organic solvent resistance, They are also expected to find use in a wide range of other fields. However, because these resin compositions contain PAs, they experience problems such as dimensional changes and lowering of the elastic modulus when they absorb moisture. This is a particularly serious drawback in the development of applications such as automobile body exterior panels, for which dimensional stability is essential.

The present invention thus has as its object to provide PPE/PA resin compositions having excellent dimensional stability when they absorb moisture, as well as good mechanical properties and characteristics.

The present inventors have discovered that by compounding PPE resins with certain types of PAs, one can obtain compositions having improved dimensional stability when they absorb moisture, without sacrificing the other properties of PPE/PA resin compositions mentioned above. That discovery has led to the present invention.

Resin compositions in accordance with the present invention thus comprise (A) 10–80 parts by weight of polyphenylene ether resins and (B) 90–20 parts by weight of polyamide resins, and are characterized in that the (B) polyamide resins (a) are polymers obtained by condensation of linear aliphatic aliamines with linear aliphatic dicarboxylic acids and aromatic dicarboxylic acids, and (b) have at least 0.04 mequiv/g terminal amino groups.

The PPE resins used in the present invention can be known materials. The term "PPE resins" refers to polymers such as those represented by the general formula 1:

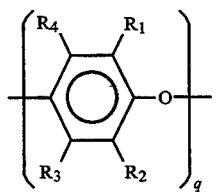

where each of $R_1$, $R_2$, $R_3$, and $R_4$ is independently a hydrogen atom, halogen atom, alkyl group, alkoxy group, or monovalent substituent group selected from haloalkyl and haloalkoxy groups having at least two carbon atoms between the halogen atom and the phenyl ring and not containing tertiary $\alpha$-carbon atoms; and q is an integer representing the degree of polymerization. It may be a polymer consisting of just one type, or a copolymer of two or more types of units represented by the above general formula. In preferred examples, $R_1$ and $R_2$ are alkyl groups having 1–4 carbon atoms, while $R_3$ and $R_4$ are hydrogen atoms or alkyl groups having 1–4 carbon atoms. Examples include poly(2, 6-dimethyl-1, 4-phenylene) ether, poly(2, 6-diethyl-1, 4-phenylene) ether, poly(2-methyl-6-ethyl-1, 4-phenylene) ether, poly(2-methyl-6-propyl-1, 4-phenylene) ether, poly(2, 6-dipropyl-1, 4-phenylene) ether and poly(2-ethyl-6-propyl-1, 4-phenylene) ether. Examples of PPE copolymers include those in which part of the repeating units are formed from trialkyl phenols, such as 2, 3, 6-trimethylphenol. The PPEs may also be copolymers having styrenic compounds grafted onto them. Examples of such styrenic compound-grafted PPEs include those obtained by graft copolymerization of styrenic compounds such as styrene, $\alpha$-methylstyrene, vinyltoluene, or chlorostyrene onto the types of PPEs described above.

The (B) polyamide resins used in the present invention are of a specific type having the characteristics listed in (a) and (b).

(a) Their diamine component consists of linear aliphatic diamines, such as those represented by the formula $$H_2N-(CH_2)_x-NH_2$$

where x is an integer from 4 to 12. Preferred examples include hexamethylenediamine, and tetramethylenediamine, etc. The linear aliphatic dicarboxylic acids in the dicarboxylic acid component may be, for example, those represented by the formula $$HOOC-(CH_2)_y-COOH$$

where y is an integer from 2 to 12. Preferred examples include adipic acid and sebacic acid. The aromatic dicarboxylic acids may be, for example, terephthalic acid, isophthalic acid and naphthalene-dicarboxylic acid. The proportions of linear aliphatic and aromatic dicarboxylic acids in the dicarboxylic acid component should be such that there are 0.05–20 moles, preferably 0.1–10 moles, of aromatic dicarboxylic acids per mole of linear aliphatic dicarboxylic acids. The polyamides used as component (B) are polymers obtained by condensation of these types of diamines and dicarboxylic acids.

(b) It is further required that these polyamides have at least 0.04 mequiv/g terminal amino groups. The terminal amino group content is preferably at least 0.05 mequiv/g. If there are less than 0.04 mequiv/g terminal amino groups, there will not be sufficient compatibility with the PPE resins, and characteristics such as impact resistance will be greatly impaired.

The amino group content can be adjusted, for example, by the addition during or after polymerization of compounds, such as diamines, having groups which react with carboxyl groups.

Polyamides of this particular type are marketed, for example, under the trade name Arlen by Mitsui Petrochemical Industries, Ltd.

In the present invention, 10–80 parts by weight of component (A) are compounded with 90–20 parts by weight of component (B), preferably 20–70 parts by weight of component (A) with 80–30 parts by weight of component (B). If less than 10 parts by weight of component (A) are used, the heat resistance of the composition will be lower, while if less than 20 parts by weight of component (B) are used, the processability of the composition will be poor.

To further increase their impact strength, compositions in accordance with the present invention may also optionally contain elastomeric substances in amounts of up to 30 parts by weight, preferably 5-20 parts by weight, per 100 parts by weight of components (A) and (B). If the amount of elastomeric substances exceeds 30 parts by weight of (A) and (B), there will be serious impairment of the heat distortion temperature and other mechanical properties.

The elastomeric substances used may include natural and synthetic polymeric substances which are elastomers at room temperature. Specific examples include natural rubber, butadiene polymers, styrene-isoprene copolymers, butadiene-styrene copolymers (including random copolymers, block copolymers, graft copolymers, etc.), isoprene polymers, chlorobutadiene polymers, butadiene-acrylonitrile copolymers, isobutylene polymers, isobutylene-butadiene copolymers, isobutylene-isoprene copolymers, acrylate ester polymers, ethylene-propylene copolymers, ethylene-propylene-diene copolymers, Thiokol rubbers, polysulfide rubbers, polyurethane rubbers, polyether rubbers (e.g., polypropylene oxide, etc.), epichlorohydrin rubbers, etc.

The elastomeric substances used may be produced by any polymerization method (e.g., emulsion polymerization, solution polymerization) using any catalyst (e.g., peroxides, trialkyl aluminum, lithium halides, nickel-containing catalysts). They may have various degrees of crosslinking and various proportions of different microstructures (e.g., cis structures, trans structures, vinyl groups, etc.), as well as various average rubber particle sizes. Copolymers of whatever type (random copolymers, block copolymers, graft copolymers, etc.) may be used. The production of these elastomeric substances may also involve copolymerization with monomers such as other olefins, dienes, aromatic vinyl compounds, acrylic acid, acrylate esters, methacrylate esters, etc. Such copolymerization may be Fandom copolymerization, block copolymerization, graft copolymerization, etc. Specific examples of such monomers include ethylene, propylene, styrene, chlorostyrene, α-methylstyrene, butadiene, isobutylene, chlorobutadiene, butene, isobutylene, methyl acrylate, acrylic acid, ethyl acrylate, butyl acrylate, methyl methacrylate, acrylonitrile, etc. It is also possible to use partially modified elastomeric substances, such as hydroxy- or carboxy-terminated polybutadiene, partially hydrogenated styrene-butadiene block copolymers, partially hydrogenated syrene-isoprene block copolymers, etc.

In the present invention, in order to increase the compatibility of the PPEs with the polyamides, part or all of the above PPEs may be replaced by PPEs modified to introduce terminal groups that react with amino groups, such as epoxy groups, carboxy groups, or acid anhydride groups. The formation of epoxy, carboxy, or acid anhydride terminal groups on the PPEs may be accomplished by known methods.

The format ion of epoxy terminal groups is described, for example, in Japanese Early Patent Disclosure Publication No. 63-125525. Epoxy-terminated PPEs can be obtained by contacting and heating the PPE with a substance having epoxy groups. Preferred examples of compounds having epoxy groups include epoxy compounds with a halogen group at one end, and epoxy compounds having epoxy groups at both ends. Specific examples of preferred compounds having an epoxy group at one end include epichlorohydrin, 2-methylepichlorohydrin, etc. Preferred examples of compounds having epoxy groups at both ends include 2, 2-bis(4-glycidyl phenyl ether)propane, epoxy resins, etc. From the standpoint of inhibiting block formation between pairs of PPEs, compounds having an epoxy group at one end are particularly preferred.

The formation of carboxyl or acid anhydride terminal groups is described, for example, in Japanese Patent Publication No. 62-500456. PPEs having carboxy or acid anhydride terminal groups are obtained by reaction of a PPE with a carboxy or anhydride group-containing acid chloride, such as trimellitic anhydride chloride.

Such modified PPEs need not necessarily have all of their terminal groups modified. The proportion of unmodified terminal groups is preferably not more than 70 wt % of the total amount of the PPE component (A).

In order to further improve the compatibility of the PPEs with the polyamides, resin compositions in accordance with the present invention may also contain compatibilizing agents added in amounts of up to 10 parts by weight per 100 parts by weight of components (A) and (B). Examples of compatibilizers which can be used include the unsaturated carboxylic acids or derivatives thereof described in Japanese Early Patent Disclosure Publication No. 56-26913, and the saturated aliphatic polycarboxylic acids described in Japanese Early Patent Disclosure Publication No. 61-502195.

The unsaturated carboxylic acids or their derivatives referred to above are compounds having in the same molecule (i) carbon-carbon double or triple bonds, and (it) carboxy, acid anhydride, amide, imide, carboxylate ester, or epoxy groups. Examples include maleic anhydride, maleic acid, fumaric acid, maleimide, maleic acid hydrazide, maleic anhydride-diamine reaction products having structures such as

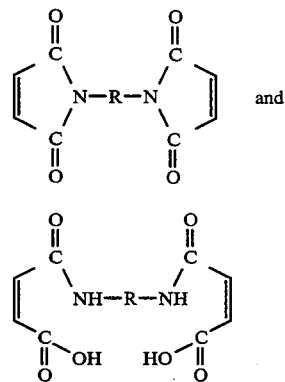

where R is an aliphatic or aromatic group, methylnadic anhydride, dichloromaleic anhydride, maleamide, soybean oil, tung oil, castor oil, linseed oil, hempseed oil, cottonseed oil, sesame oil, other vegetable oils, peanut oil, camellia oil, olive oil, palm oil, sardine oil, other natural oils, epoxidized soybean oil and other epoxidized natural oils, acrylic acid, butenoic acid, crotonic acid, vinylacetic acid, methacrylic acid, pentenoic acid, angelic acid, tibric acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2, 2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2, 4-pentadienoic acid, 2, 4-hexadienoic acid, diallylacetic acid, geranic acid, 2, 4-decadienoic acid, 2, 4-dodecadienoic acid, 9, 12-hexadecadienoic acid, 9, 12-octadecadienoic acid, hexadecatrienoic acid, linolic acid, linoleic acid, octadecatrienoic acid, eicosadienoic acid, eicosatrienoic acid, eicosatetraenoic acid, ricinolic acid, eleostearic acid, oleic acid, eicosapentaenoic acid, erushinic acid, docosadienoic acid, docosatrienoic acid, docosatetraenoic acid, docosapentaenoic acid, tetracosenoic acid, hexacosenoic acid, hexacodienoic acid, octacosenoic acid, traakontenoic acid, and other unsaturated carboxylic acids, as well as esters, amides, and anhydrides of such unsaturated carboxylic acids, adducts of maleic anhydride or phenols with oligomers (e.g., average molecular weight approximately 500–10,000) or high polymers (e.g., average molecular weight over 10,000) of butadiene, isoprene, etc., and similar polymers modified to introduce carboxy groups, epoxy groups, etc.

Examples of the saturated aliphatic polycarboxylic acids or derivatives thereof referred to above include compounds represented by the formula

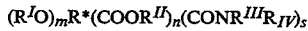

$(R^{I}O)_m R^*(COOR^{II})_n (CONR^{III}R_{IV})_s$ where is a linear or branched saturated aliphatic hydrocarbyl group having 2–20 carbon atoms, preferably 2–10 carbon atoms, $R^1$ is a hydrogen atom or an alkyl, aryl, acyl, or carbonyldioxy group having 1–10 carbon atoms, preferably 1–6 carbon atoms, more preferably 1–4 carbon atoms, most preferably a hydrogen atom, $R^{II}$ is a hydrogen atom or an alkyl or aryl group having 1–20 carbon atoms, preferably 1–10 carbon atoms, $R^{III}$ and $R^{IV}$ are hydrogen atoms or alkyl or aryl groups having 1–10 carbon atoms, preferably 1–6 carbon atoms, more preferably 1–4 carbon atoms, $m = 1$, $n + s \geq 2$, preferably $n + s = 2$ or 3, $n \geq 0$, $S \geq 0$, and the $(R^{I}O)$ groups are located in $\alpha$ or $\beta$ positions with respect to the carbonyl groups, and at least one pair of carbonyl groups has 2–6 carbon atoms between them.

The saturated aliphatic polycarboxylic acid derivatives referred to include esters, amides, anhydrides, hydrates, and salts of saturated aliphatic polycarboxylic acids.

Examples of saturated aliphatic polycarboxylic acids include citric acid, malic acid, agaricic acid, etc. Esters of such acids include citric acid acetyl ester, monostearyl ester, distearyl ester, etc. Amides include citric acid N, N'-diethylamide, N, N'-dipropylamide, N-phenylamide, N-dodecylamide, and N, N'-didodecylamide, malic acid N-dodecylamide, etc. Salts include potassium salts, calcium salts, etc.

Compatibilizing agents such as these may be used singly or in combinations of two or more.

In addition, depending on the intended application, other common additives, such as pigments, dyes, reinforcing agents (glass fibers, carbon fibers, potassium titanate fibers, etc.), fillers (carbon black, silica, titanium oxide, etc.), heat stabilizers, antioxidants, weatherproofing agents, lubricants, release agents, crystal nucleating agents, plasticizers, flame retardants, flow promoters, antistatic agents, etc., may also be added during compounding or molding of resin compositions in accordance with the present invention, so long as they do not impair the properties of the compositions.

There is no particular restriction on the method used to prepare resin compositions in accordance with the present invention. The usual techniques may be satisfactorily employed, although melt mixing methods are generally preferred. It is possible to use minor amounts of solvents, but this is usually not necessary. The equipment used may be, for example, an extruder, a Banbury mixer, a roller, a kneader, etc., which may be operated batchwise or continuously. There is no particular restriction on the order of mixing of the components.

EXAMPLES

The present invent ion will now be described in greater detail by means of some examples, although the invention is by no means limited to the examples shown here.

The following compounds were used in these examples and comparisons.

Component (A)

PPE: Poly(2, 6-dimethyl, 1, 4-phenylene) ether having intrinsic viscosity (in chloroform at 25° C.) 0.48 dL/g Component (B)

Polyamide:

PA-1: Arlen Neat Resin (trademark of Mitsui Petrochemical Industries), a polyamide formed by condensation of hexamethylenediamine with terephthalic acid and adipic acid, having intrinsic viscosity (in concentrated sulfuric acid at 30° C.) 1.30, melting point 312° C., glass transition temperature 83° C., and terminal amino group content 0.051 mequiv/g PA-2: Arlen Neat Resin (trademark of Mitsui Petrochemical Industries), a polyamide formed by condensation of hexamethylenediamine with terephthalic acid and adipic acid, having intrinsic viscosity (in concentrated sulfuric acid at 30° C.) 1.00, melting point 312° C., glass transition temperature 88° C., and terminal amino group content 0.099 mequiv/g PA-3 (for comparison): Arlen Neat Resin (trademark of Mitsui Petrochemical Industries), a polyamide formed by condensation of hexamethylenediamine with terephthalic acid and adipic acid, having intrinsic viscosity (in concentrated sulfuric acid at 30° C.) 1.04, melting point 312° C., glass transition temperature 83° C., and terminal amino group content 0.036 mequiv/g PA-4 (for comparison): Nylon 6, with relative viscosity 2.6 (number-average molecular weight 12,700), melting point 220° C., and terminal amino group content 0.046 mequiv/g PA-5 (for comparison): Nylon 6, 6 having relative viscosity 2.8 (number-average molecular weight 20,000), melting point 255° C., and terminal amino group content 0.055 mequiv/g Optional Components Elastomeric Substance:

KRATON 01651 (trademark, produced by Shell Chemical Co.), hydrogenated styrene-ethylene-butadiene-styrene copolymer (SEBS)

Compatibilizing Agent: Citric acid

In these examples and comparisons, the various properties were measured by the following methods.

(1) Melt Index (MI):

JIS K 7210 standard method, at 320° C. and 5 kg load (280° C. and 5 kg load in Comparisons 3 and 4)

(2) Tensile Properties:
ASTM D638 standard method
(3) Flexural Properties:
ASTM D790 standard method
(4) Izod Impact Strength: ASTM D256 standard method, notched
(5) Heat Distortion Temperature (HDT): ASTM D648 standard method (with 4.6 kg/cm$^2$ load)

(6) Moisture Absorption (Dimensional Stability):

The increase in weight and dimensions due to moisture absorption were checked as follows:

ASTM ⅛-inch test specimens were marked with index lines (at 40-mm intervals), then immersed in a thermostat bath at 95° C. Each test specimen was removed from the bath after the time interval listed in Table 2, and its weight and index line spacing were measured. The results are listed as weight increase ratios and dimensional expansion ratios.

(7) Compatibility:

Microscope specimens were cut from test pieces using a microtome, then etched with chloroform, and examined with a scanning electron microscope to measure the dispersed PPE particle size. Specimens showing dispersed particle sizes of 2 μm or less were rated A (excellent compatibility), those with dispersed particle sizes of 3–4 μm were rated B (good compatibility), and those with dispersed particle sizes of 5 μm or greater were rated C (poor compatibility), Examples 1–3, Comparisons 1–4

Mixtures of the amounts (parts by weight) of different components listed in Table 1 were fed to a vacuum-vented twin-screw extruder operating at 330° C. to form pellets, which were then molded using an injection-molding machine operating at a cylinder temperature of 320° C. injection pressure 80 kg/cm$^2$, and mold temperature 80° C., to form specimens whose various properties were then tested, The results are listed in Table 1. The results of the moisture absorption tests for Example 2 and Comparisons 2 and 4 are listed in Table 2.

Resin compositions in accordance with the present invention have extremely good dimensional stability when they absorb moisture, along with excellent mechanical characteristics and properties. They can thus be used in a wide range of applications, and are of great industrial value.

TABLE 1

|  | Examples | | | Comparisons | | | |
| --- | --- | --- | --- | --- | --- | --- | --- |
|  | 1 | 2 | 3 | 1 | 2 | 3 | 4 |
| Component (wt. parts) | | | | | | | |
| PPE | 40 | 40 | 50 | 50 | 40 | 40 | 40 |
| PA-1 | 50 | — | — | — | — | — | — |
| PA-2 | — | 50 | 50 | — | — | — | — |
| PA-3 | — | — | — | 50 | 50 | — | — |
| PA-4 | — | — | — | — | — | 50 | — |
| PA-5 | — | — | — | — | — | — | 50 |
| SEBS | 10 | 10 | — | — | 10 | 10 | 10 |
| Citric Acid | 1 | 1 | 1 | 1 | 1 | 1 | 1 |
| Izod Impact Strength (kg-cm/cm) | 60 | 62 | 5 | 1 | 7 | 69 | 65 |
| Tensile Strength (kg/cm$^2$) | 660 | 660 | 680 | 510 | 570 | 560 | 570 |
| Flexural Modulus (kg/cm$^2$) | 27000 | 28000 | 31000 | 29000 | 26000 | 21000 | 23000 |
| HDT (°C.) | 206 | 209 | 216 | 212 | 207 | 187 | 198 |
| MI (g/10 min) | 13 | 12 | 21 | 27 | 26 | 11 | 9 |
| Compatibility | A | A | A | C | C | B | A |

TABLE 2

|  |  | Immersion Time (hours) | | | | | | | | |
| --- | --- | --- | --- | --- | --- | --- | --- | --- | --- | --- |
|  |  | 0.5 | 3 | 6 | 9 | 15 | 24 | 36 | 48 | 120 |
| Ex. 2 | Weight Increase (%) | 0.8 | 1.3 | 1.8 | 2.2 | 2.7 | 3.0 | 3.2 | 3.2 | 3.5 |
|  | Size Increase (%) | 0.03 | 0.10 | 0.18 | 0.24 | 0.32 | 0.39 | 0.42 | 0.44 | 0.48 |
| Comp. 3 | Weight Increase (%) | 1.5 | 2.5 | 3.3 | 4.0 | 4.6 | 5.0 | 5.1 | 5.1 | 5.1 |
|  | Size Increase (%) | 0.15 | 0.40 | 0.62 | 0.78 | 1.02 | 1.20 | 1.25 | 1.25 | 1.25 |
| Comp. 4 | Weight Increase (%) | 1.2 | 2.3 | 3.1 | 3.7 | 4.3 | 4.7 | 4.7 | 4.7 | 4.7 |
|  | Size Increase (%) | 0.13 | 0.30 | 0.53 | 0.70 | 0.91 | 1.10 | 1.15 | 1.15 | 1.15 |

We claim:

1. A resin composition comprising:
   (A) 10–80 parts by weight polyphenylene ether resin, and
   (B) 90–20 parts by weight polyamide resin said parts by weight of polyphenylene ether and polyamide resin being in parts by weight per 100 weight parts of polyphenylene ether resin and polyamide resin combined; said polyamide resin comprising:
   (a) a polymer obtained by condensation of a linear aliphatic diamine with a linear aliphatic dicarboxylic acid and an aromatic dicarboxylic acid; and
   (b) said polyamide resin having at least 0.04 milliequivalents/gram terminal amino groups; and
   wherein said linear aliphatic diamine is hexamethylenediamine, said linear aliphatic dicarboxylic acid is adipic acid, and said aromatic dicarboxylic acid is terephthalic acid; and
   wherein said composition further comprises a hydrogenated styrene-ethylene-butadiene-styrene copolymer and citric acid.

2. A resin composition as in claim 1, wherein the hydrogenated styrene-ethylene-butadiene-styrene copolymer is present in an amount of up to 30 parts by weight per 100 parts of combined (A) and (B).

3. A resin composition as in claim 1, wherein there are 0.05 to 20 moles of aromatic dicarboxylic acid per mole of linear aliphatic dicarboxylic acid.

4. A resin composition as in claim 1, wherein there are 0.1 to 10 moles of aromatic dicarboxylic acid per mole of linear aliphatic dicarboxylic acid.

5. A resin composition as in claim 1, wherein said polyamide resin has at least 0.05 milliequivalents/gram terminal amino groups.

6. A resin composition as in claim 1, wherein component (A) is present in an amount of 20-70 parts by weight per 100 parts by weight of (A) and (B) combined, and component (B) is present in an amount of 80-30 parts by weight per 100 parts by weight of (A) and (B) combined.

7. A resin composition as in claim 1, wherein the hydrogenated styrene-ethylene-butadiene-styrene copolymer is present in an amount of 5-20 parts by weight per 100 parts by weight of (A) plus (B).

8. A resin composition as in claim 1, wherein said composition consists essentially of said polyphenylene ether resin, said polyamide resin, said hydrogenated styrene-ethylene-butadiene-styrene copolymer and said citric acid.

9. A resin composition as in claim 1, wherein said composition consists of said polyphenylene ether resin, said polyamide resin, said hydrogenated styrene-ethylene-butadiene-styrene copolymer and said citric acid.

* * * * *